United States Patent Office 3,348,954
Patented Oct. 24, 1967

---

3,348,954
PROCESS FOR PREPARING MEAT FLAVOR
AND AROMA COMPOSITIONS
Julius Green, New City, N.Y., assignor to General Foods Corporation, White Plains, N.Y., a corporation of Delaware
No Drawing. Filed Feb. 16, 1966, Ser. No. 527,780
10 Claims. (Cl. 99—140)

The present application is a continuation-in-part of Ser. No. 839,307, filed Sept. 11, 1959, now abandoned, Ser. No. 115,096, filed June 6, 1961, now abandoned, and Ser. No. 304,666, filed Aug. 27, 1963, now abandoned.

This invention relates to the production of roast meat flavor and aroma compositions and more particularly is concerned with the production of roast meat flavor and aroma compositions which can be employed alone or in combination with other flavor and aroma constituents capable of use in meat and other food products where roast meat flavors and aromas are desired.

As is well known to those skilled in the art, roast meat possesses a highly desirable flavor and aroma. These are particularly apparent during roasting and also when the freshly roasted meat is eaten. The presence of these characteristic flavors and aromas are among the distinguishing features of good roast meat. Unfortunately, however, it appears that a substantial portion of these features may be lost to the atmosphere during roasting as evidenced by the strong and characteristic aroma which is readily noticeable when the meat is being roasted. In addition, when meat other than prime grade is roasted, and particularly in the case of beef, the development of the characteristic roast meat flavor and aroma is considerably less.

Even in the case of the best grades of roast meat it is found that the inner portions of the roast do not possess any substantial amount of the desirable flavor and aroma bearing constituents. It appears that the bulk of the flavor and aroma bearing constituents are produced in and remain in the surface portions of the meat, the remainder and bulk of the meat contributing little or nothing to the roast meat flavor.

In the production of roast beef gravies from all but the very best cuts of beef the flavor is considerably lessened, from both a quality and quantity standponit, and accordingly, it is frequently necessary to add beef extracts to obtain an acceptable gravy, but even this gravy fails to possess the eminently desirable characteristics of a true roast beef gravy.

Prior attempts to produce beef flavors resulted in products known as "beef extracts." These are generally by-products of the meat packing industry and are of two types, "essence of beef" and "beef extract." Essence of beef is the product of prolonged water extraction of beef to produce a liquid which gels on cooking. Usually 13 to 14 parts of meat yield one part of extract having a moisture content of 34%. Beef extract is a by-product of the manufacture of corned beef and is obtained by immersing beef in boiling water for a limited time. The resultant extract is then concentrated, usually in open pans, to yield a dark brown, pungent, acid, paste-like, semi-solid material. Usually, 50 parts or more of trimmed meat yields as a by-product one part of extract having 17% moisture. Although each of these products, which are typical of the prior art products in general, possesses somewhat of a meaty flavor when diluted to use concentration, they produce a flavor and aroma typical of beef broth. Many of the commercial beef extracts of the prior art possess, per se, pungent, unclean, unpleasant, animal flavors and odors. On dilution to common use level, a slightly salty, frothy flavor is obtained. On combination with other spices and components, this yields the commonly known "beef tea" or "beef bouillon" flavor. Attempts to increase the beef intensity of such compositions by use of more beef extract results in an unpleasant effect derived from the above described flavor characteristics of the extract. Beef extract in no way contributes true roast beef flavor and aromas.

It is an object of this invention to produce roast meat flavor and aroma compositions which can be in the form of a liquid or a solid. A more specific object of this invention is to produce a liquefied water dispersible roast meat flavor and aroma composition which can be dried to a stable form. It is another object of this invention to provide a process for producing roast meat flavor and aroma compositions of the stated type from less costly grades or portions of meat, including scraps, trimmings, organs and the like as well as from choice cuts of meat. It is yet another object of this invention to provide a process capable of increasing yields of roast meat flavor and aroma by virtue of utilization of all of the meat rather than merely the exterior portions. It is a further object of this invention to provide a process capable of retaining all those volatile flavor and aroma constituents normally lost during conventional roasting. It is yet a further object of this invention to provide a process for preparing stable, edible, roast meat flavor and aroma compositions. Other objects of the invention will be apparent to those skilled in the art from an examination of the specification.

It has now been discovered that the objects of this invention can be obtained by liquefying meat particles by heating in the presence of moisture in a confined atmosphere at elevated roasting temperatures, typically above 330° F. and superatmospheric pressures sufficient to hydrolyze the meat protein whereat said roast meat flavor and aroma is developed throughout said meat. The roast meat flavor and aroma of the composition of the present invention duplicates the flavor and aroma which is normally produced in the surface portions of the roast and those portions immediately adjacent to the surface portions (i.e., the true roast meat flavor). In addition, the present invention enables the flavors and aromas normally lost in roasting to be entrapped and retained in the product.

The term "meat" includes the edible cuts of portions of meat obtained from the organs, skin, skeletal muscle or like edible portions of mammals such as cattle, hogs, sheep; fowl such as chicken; fish and the like. The term "liquefied meat" is used to describe the mixture of solution and suspended particles which result from the hydrolysis and reaction of meat according to the present invention.

In producing flavor and aroma compositions according to certain embodiments of this invention a raw meat charge is preferably comminuted to effect size reduction although large pieces of meat can be used, if desired. Typically, comminution may be accomplished by grinding, chopping, mincing, etc. When the comminution is such as to give some discrete pieces of meat, it is preferred that the maximum piece size be in the order of about 0.5 to 1 inch. Preferably, the raw meat charge is prepared by grinding in a meat grinder to give a soft, pliable, formless mass which can readily be treated as hereinafter set forth in detail.

The so prepared raw meat charge may then be mixed with aqueous medium, typically water, although other aqueous media such as various salt solutions may be employed. Although the amount of aqueous medium used is not critical, it is preferable to use an amount at least sufficient to prevent localized charring of the meat charge during subsequent treatment. For each 100 pounds of raw meat charge 0 to 50 pounds of water is the preferred amount which may be added, although more may be added if desired. In the case of raw meat, the lean portion of which is predominately water, little or no water need be overtly added when elevating the meat temperature through the medium of steam injection; when using a dry heat source. On the other hand, sufficient water must be added to prevent excessive charring. In the case of beef scraps and trimmings, it is preferred to add 25 pounds of water per 100 pounds of meat.

The aqueous medium employed will preferably be water. Flavor enhancers typified by salt, lactic acid, etc. may be added along with the water. When lactic acid is employed to provide or enhance the "tanginess" of the flavor, it is preferred to employ this in amount of 0.01%–3.0%. In the case of a raw beef charge, it is preferred to employ 0.05–1% by weight of the meat.

Mixing of the charge meat and the aqueous medium may be effected by addition of the comminuted meat to a body of the aqueous medium followed by agitation of the mixture to obtain uniformity.

In a preferred embodiment, and preferably during mixing, an oleaginous material is added to a raw meat containing mixture. Typically, beef tallow, lard, vegetable oils such as cottonseed oil, etc. may be employed in amount of 0 to 50 pounds per hundred pounds of meat, although larger amounts of the oleaginous material may be added, if desired. In the case of the raw beef charge, it has been found that the oleaginous material extends and fixes the roast beef flavor and aroma so that more flavor and aroma of substantially the same intensity is obtained from a given charge of beef. Oleaginous materials may also be added, if desired, to the other meats suitable for use in the present invention. Included with the oleaginous material may be emulsifiers typified by mono- and di-glycerides and other partial esters of polyhydroxy compounds and higher fatty acids.

The desired flavor and aroma composition is obtained by heating the mixture containing the raw meat charge and aqueous medium to elevated temperature and under these conditions, the interaction of the meat and the moisture produces a highly desirable roast meat flavor.

Under preferred conditions, the mixture may be heated to temperatures of the order of above about 330° F.; in the case of beef 350°–420° F. and more preferably 360°–375° F.; 360°–380° F. in the case of pork, and in the case of chicken 345° F.–365° F. and more preferably 355° F. It has been found, using presently available commercial batch autoclaves such as described in the following examples, that temperatures in excess of 400° F. yield progressively more of a burnt or charred flavor typical of some minor portions of meat roasted normally and which of themselves will have utility as components of formulated meat flavors. Thus, it will be possible to utilize two or more of the products of the present invention obtained at different temperatures of processing to provide the desirable attributes of a flavoring material having the flavor characteristics typical of roast meat. Temperatures which produce more of a burnt or charred flavor rather than the desired roast beef flavor are undesirable for most purposes. Heating to temperatures less than about 330° F. does not give the desired roasted flavor and aroma composition. The time required to heat the mixture to the maximum temperature is not critical, although it is preferable to avoid excessive heat-up times because they may cause premature flavor reactions before reaching the desired operating temperature range. Typically, in a batch autoclave this will be effected in 5 to 45, say 20 minutes, depending upon particular characteristics of the system including the raw materials, the quantity, the temperature to which the mixture is heated, the method of heating, etc.

While present commercial equipment produces progressively more of a burnt or charred flavor as the temperature is increased about about 400°–450° F. depending on the particular equipment and processing conditions employed such temperatures are not limiting. As is well known to those skilled in the art high temperature-short time processing of many food products is now carried out commercially. The use of exteremely high temperatures for extremely short period of time can be employed in the present invention when thin films of the meat slurry are treated. Under proper conditions, the desired result may be obtained even when employing temperatures in the order of 750°–1000° F. for periods of time in the order of a second or less.

The heated mixture may be maintained at the maximum temperature to which it is heated for a period of time sufficient to cause the visible discrete meat particles to substantially disappear and to develop and intensify the flavor of the product composition, but insufficient to permit formation of excess charred or burnt flavor characteristics. The desired results can usually be obtained by maintaining the mixture at the maximum temperature for a period of time ranging from 0 to 5 minutes, although longer periods of time may be used if necessary. Under preferred conditions, the mixture will be heated to the desired temperature and immediately cooled to a temperature less than the atmospheric boiling point of the liquefied meat and preferably to a temperature below 200° F.

The total pressure to which the mixture is subjected during heating will typically be the autogenous pressure i.e. the equilibrium pressure of steam at the temperature employed plus any pressure that is developed due to the generations of gases caused by the reaction of the meat. Typically, this will be above about 115 p.s.i.g. and preferably 150–311 p.s.i.g. Preferably, agitation is employed during the course of the reaction to provide uniform heat exchange and to prevent charring of the meat during the heating and cooling stages of the operation.

During the course of the reaction, the meat charge is liquefied and visible discrete meat fibers disappear although small fibers typically having a maximum length of 1.0 inch may be observed. Although the precise nature of the "reaction" is unknown, it is possible that extraction of aromatic constituents and degradation on hydrolysis of proteinaceous components may occur. When meat undergoes heating, the proteins first coagulate, and when sufficient heat is applied, these proteins undergo a series of disintegration steps (including hydrolysis) into cleavage products, through the proteoses, peptones, peptides, amino acids and amides. If allowed to proceed further, amines, sulphur compounds and possibly phenols are released. Several of the amino acids with limited quantities of sulphur compounds and ammonia fractions produce the flavor known as roast meat.

The product, as withdrawn from the heating vessel, typically an autoclave, is a brown, roast meat flavor-and aroma-bearing liquid. This product may be employed as an ingredient for soups, gravies, and as a flavor enhancer and fortifier for meat and meat substitutes, etc. in which application the presence of a roast meat flavor is desired. If it is desired that the liquefied meat product contains no discrete meat particles it can be filtered to remove any solid meat that may be present. This product may also be employed as a superior dog food flavor factor. This product may also be condensed by any suitable means such as by evaporation to the form of a concentrated liquid or paste which may then be employed in the above applications.

Furthermore, the liquified meat may be homogenized and dried by common drying means such as spray drying, etc. to give a dry, free-flowing powder containing short meat fibers of a length less than 0.025 inch and preferably together with fat and lactic acid. The powder is tan in color and is readily dispersed in water and in the dry state remains stable at room temperature.

In accordance with yet another embodiment of the present invention, a superior dog food flavor factor may be produced from animal l:vers, tongue, cheeks and preferably those obtained from beef. The livers, tongues or cheeks are heated in the presence of moisture in a confined atmosphere at temperatures from about 330° F. to about 425° F. depending upon the size of the reaction vessel or autoclave used and the rate of heating. As in the preceding embodiment, the pressure employed is the autogenous pressure developed within the autoclave. The resulting material may then be homogenized or the supernatant material removed and used separately.

Dog food, to which the treated meat of any of the embodiments of the present invention is added, is preferred by dogs over dog foods not containing the so-treated meat.

When employing meat treated in accordance with the present invention, the spoilage problem which is normally encountered when meat is used in dog food is avoided. The treated meat can be readily applied to dog biscuits or meal simply by spraying a suspension of the reaction liquor on the dog food or may be incorporated into the meal or biscuits.

While the present invention is particularly concerned with the production of roast meat flavors, the process also is capable of producing other novel meat flavors. For example, chicken hearts treated in accordance with the present invention produce a chicken liver-like flavor which may be used as a complete or partial replacement for chicken livers in spread products or as a flavoring ingredient where a liver-like flavor is desired. When preparing the chicken liver-like flavor from chicken hearts, equal weights of water and chicken hearts may be employed.

The following examples illustrate several embodiments of the present invention.

*Example 1*

Twenty-two pounds of beef which had been passed through a meat grinder with one-quarter inch holes, five and one-half pounds of water, five and one-half pounds of hydrogenated fat, and fifty-three milliliters of lactic acid were placed in a 5 gallon autoclave.

The autoclave was equipped with a jacket-piped for steam heating and water cooling, internal coils piped for cooling; a thermowell extending into the center of the autoclave cavity to contain a thermocouple (which when attached to a potentiometer was used to determine internal temperature of the autoclave); a valved bent opening for the relief of gases from the head of the autoclave; a pressure indicating gauge; a separate opening piped to a rupture disc as a safety relief; a flush valve in the base of the autoclave to provide for removal of the contents of the vessel and an anchor type agitator running at approximately 475 r.p.m.

The mixture was heated, with the autoclave vent valve open, by the introduction of steam at a temperature of 400° F. into the jacket of the autoclave until a temperature of approximately 212° F. was attained, approximately three minutes. At such time the air in the autoclave was displaced by steam and the exhaust valve of the autoclave was closed. Heating was continued for three minutes until the temperature of the mixture within the autoclave reached 360° F. The steam fed to the jacket of the autoclave was immediately shut off and the autoclave contents cooled by running cold water into the jacket and coils of the autoclave. When the temperature of the autoclave decreased to 150° F. (four minutes cooling time), the autoclave was opened and its contents which were in substantially liquid form were removed.

The resulting liquid material was passed through a homogenizer to reduce any particles to a size of 0.015–0.020″ and spray dried in a vertical spray dryer to yield a dry powdered product. The dried product when reconstituted possessed the flavor of roast beef which would be obtained from prime cuts of beef, and in addition, was water dispersible.

*Example 2*

Twenty-two pounds of 80 percent lean pork which had been passed through a meat grinder with one-quarter inch holes, seven pounds of water and fifty-three milliliters of lactic acid were placed in a 5 gallon autoclave such as used in Example 1.

The mixture was heated with the vent valve open by the introduction of steam at a pressure of 250 p.s.i.g. into the jacket of the autoclave until a temperature of approximately 212° F. was attained, in approximately two minutes. At such time the air in the autoclave was displaced by steam and the vent valve of the autoclave was closed. Heating was continued to 380° F. which occurred in approximately four additional minutes. The steam fed to the jacket of the autoclave was shut off and the autoclave contents cooled by running water into the jacket and coils of the autoclave. When the temperature of the autoclave contents was cooled to 150° F., in approximately six minutes, the autoclave was opened and the liquefied material was discharged. The liquefied material was homogenized to reduce particle size and spray dried. The resulting product was a cream colored powder, had an aroma characteristic of a good roast pork loin or similar cut, was disperisible in water and on reconstitution in water with salt (to taste) had a good roast pork flavor.

*Example 3*

Twenty-two pounds of chicken (necks and backs) and eleven pounds of water were placed in a 5 gallon autoclave such as used in Example 1.

The mixture in the autoclave was heated with the vent valve open by the introduction of steam into the jacket of the autoclave until a temperature of approximately 212° F. was attained in two minutes. At such time the air in the autoclave was displaced by steam and the vent valve was closed. Heating was continued until the contents of the autoclave reached a temperature of 355° F., which occurred after four additional minutes of heating. The steam fed to the jacket of the autoclave was shut off and the autoclave contents cooled by running cold water into the jacket and coils of the autoclave. When the temperature of the autoclave was reduced to 150° F., in approximately five minutes, the autoclave was opened and the liquefied material discharged. The liquefied material was homogenized to reduce the particle size and spray dried. The resulting product was cream colored, dispersible in water, and on reconstitution in water with salt (to taste) had a good chicken flavor.

*Example 4*

Four hundred pounds of beef which had been passed through a meat grinder with one-quarter inch holes, one hundred pounds of hydrogenated fat and nine hundred and sixty-five milliliters of lactic acid were placed in a large autoclave. The autoclave used in this example was a vessel of 130 gallon total internal volume. The autoclave was also equipped with a water line; a liquid feed system; a vent line; a safety vent line with relief valve; a pressure indicating gauge; a thermowell extending into the autoclave interior (for use in measuring temperature of material being processed); an agitator mechanism, agitation being by two propellers on the suspended shaft turning at a rate of 150 r.p.m.

The contents were heated from room temperature by steam injection (steam being fed from a compressor capable of producing 250 pounds of 450 p.s.i.g. steam per hour), with the vent valve open, to 200° F., in approximately five minutes, at which time the vent was closed. During the venting period and the remainder of the run, the ingredients were agitated by means of the marine type agitator. The venting period was a means of displacing the air by steam. Steam injection continued for thirty-four additional minutes until a temperature of 397° F. was obtained in the vessel. At this time, the heating was discontinued and the cooling period was started with cooling water in the jacket. A maximum roast temperature of 400° F. was attained and, after fifty-five minutes cooling, the contents of the autoclave had reached a temperature of 150° F. and were removed from the vessel. The material obtained from the autoclave was passed through a Puc Mill three times at the minimum clearance setting to decrease particle size. The material was dried to a coarse powder in a vertical spray dryer. The soluble powder dispersed in water has a roast beef flavor resembling beef gravy.

*Example 5*

Five hundred gms. of ground chicken hearts, excess fat and blood having been removed, and five hundred gms. of water were placed in a standard two liter Parr autoclave. The autoclave was provided with a valved vent for release of gases; internal coils for cooling; a thermowell for the insertion of a temperature measuring device to determine the internal temperature of the autoclave; and outlet connected to a pressure gauge to indicate internal pressure; an outlet connected to a safety relief valve to provide a means of relieving excessive pressures which might build up internally; and a propeller blade type agitator mounted on a shaft which was externally driven through a belt by a motor. Heat was supplied to the exterior, in this example, by electric coils. With the vent valve open and agitation supplied, heat was applied to the exterior until the emanation of vapor was observed (at a temperature of approximately 200° F. in thirty minutes) at which time the vent was closed. Heating was continued for thirty minutes until the internal temperature had reached 350° F., at which time the heating was stopped and cooling water was sent through the internal coils. Cooling was continued for seven minutes until the temperature was reduced to 75° F., and the product (a slurry) was removed from the autoclave.

This product was homogenized to achieve a smooth slurry which, when used in a spread, had a flavor similar to such a product made from chicken livers.

*Example 6*

Fresh beef liver was ground in a Hobart meat grinder. One thousand grams were added to a Parr type autoclave and the autoclave was then electrically heated (Variac setting 2100) with the vent open to atmosphere until steam escaped and closed after 30 sec. of steaming. The time to this point was approximately 30 minutes. The autoclave was then allowed to heat until the temperature reached 425° F. and immediately cooled by running cold water through the internal cooling coils. This interval of time was about 40 minutes. After approximately 7 minutes of quenching with cold water, the autoclave was removed from the heater and placed in a cold water bath. When the temperature dropped below 212° F. the residual pressure was bled off, the contents removed and blended in a Waring Blendor. Solids analysis of this material averaged 28%. When the pressure cooked sample was sprayed on dog food at a 0.1% (dry basis), the dog food was highly preferred to a dog food without the addition of the treated material.

*Example 7*

Twenty-six pounds of fresh ground beef liver were introduced into a 5 gallon autoclave such as used in Example 1. The liver mixture was heated with the vent valve open by the introduction of steam into the jacket of the autoclave until steam started to escape from the autoclave, the steam being allowed to escape for one minute. The vent valve was then closed and the heating continued until a temperature of 416° F. was obtained. The steam fed to the jacket of the autoclave was shut off and the autoclave contents cooled by running cold water into the jacket and coils of the autoclave. When the temperature of the autoclave contents was cooled to about 100° F. the autoclave was vented, opened and the material drawn off and homogenized by three passes through a Puc Mill. The material when applied to dog food by surface addition at a level of 0.1% significantly increased the acceptance of the food.

*Example 8*

Five hundred pounds of fresh beef liver which had been passed through a meat grinder was introduced into an autoclave such as used in Example 4. The contents of the autoclave were heated by the injection of steam into the material. The vent valve of the autoclave remained open during the initial heat up to a temperature of approximately 185° F. in ten minutes at which time the steady emanation of steam was noted. The vent remained open for two additional minutes to ensure the displacement of air in the chamber by steam. The vent valve was closed and heating continued until a temperature of 405° F. was attained in a total elapsed time of 58 minutes at which time heating was discontinued and cooling water fed to the jacket. Cooling continued until a temperature of approximately 100° F. was attained in an additional fifteen minutes. The material obtained from the autoclave was passed through a Puc Mill three times to decrease particle size. When employed at a 0.1% level on dog food, the acceptance of the food was significantly increased.

While the preceding examples have been used to illustrate several embodiments of the present invention, it is to be understood that these examples are for purposes of illustration only and that the invention is not limited thereto since various changes can be made by those skilled-in-the-art without departing from its scope and spirit.

What is claimed is:

1. A process for preparing a water-dispersible roast meat flavor and aroma composition of high concentration and strength which comprises liquefying meat by heating said meat in the presence of moisture at temperatures above about 330° F. and autogenous pressures to hydrolyze the meat protein to an extent whereat visible discrete meat fibers substantially disappear and said roast meat flavor and aroma is developed throughout the liquefied meat and thereafter immediately cooling said liquefied meat to a temperature less than the atmospheric boiling point of the liquefied meat.

2. A process for preparing a water-dispersible roast meat flavor and aroma composition of high concentration and strength which comprises liquefying comminuted meat by heating said meat in the presence of moisture at temperatures above about 330° F. and autogenous pressures to hydrolyze the meat protein and maintaining said comminuted meat at such temperatures and pressures until visible discrete meat fibers substantially disappear whereby said roast meat flavor and aroma is developed throughout the liquefied meat, and thereafter immediately cooling said liquefied meat to a temperature below about 200° F.

3. A process for preparing a water-dispersible roast meat flavor and aroma composition which comprises liquefying comminuted meat by heating said meat in the presence of 0–50 pounds of water per 100 pounds of meat at temperatures of about 330° F.–425° F., and autogenous pressures to hydrolyze the meat protein and maintaining said meat such temperatures and pressures for 0–5 minutes until visible discrete meat fibers substantially disappear whereby said roast meat flavor and aroma is developed throughout the liquefied meat and thereafter immediately cooling said liquefied meat to a temperature below the atmospheric boiling point of said liquefied meat.

4. A process for preparing a water-dispersible roast meat flavor and aroma composition which comprises liquefying comminuted meat by heating in the presence of 0–50 pounds of water per 100 pounds of meat and 0.01%–3% of lactic acid by weight of the meat at temperatures of about 330° F.–425° F. and autogenous pressures to hydrolyze the meat protein and maintaining said meat at such temperatures and pressures for 0–5 minutes until visible discrete meat fibers substantially disappear whereby said roast meat flavor and aroma is developed throughout the liquefied meat, and thereafter immediately cooling said liquefied meat to a temperature below about 200° F.

5. A process for preparing a water-dispersible roast meat flavor and aroma composition which comprises liquefying comminuted meat by heating in the presence of 0–50 pounds of water per 100 pounds of meat, 0.01%–3.0% of lactic acid by weight of the meat and an oleaginous material at temperatures of about 330° F.–425° F. and autogenous pressures to hydrolyze the meat protein and maintaining said meat at such temperatures and pressures until visible discrete meat fibers substantially disappear whereby said roast meat flavor and aroma is developed throughout the liquefied meat, and thereafter immediately cooling said liquefied meat to a temperature below the atmospheric boiling point of said liquefied meat.

6. A process for preparing a water-dispersible roast beef flavor and aroma composition which comprises liquefying comminuted beef by heating in the presence of moisture at temperatures of about 330° F.–420° F. and autogenous pressures to hydrolyze the beef protein and maintaining said comminuted beef at such temperatures and pressures until visible discrete meat fibers substantially disappear whereby said roast beef flavor and aroma is developed throughout the liquefied beef, and thereafter immediately cooling said liquefied beef to less than 200° F.

7. A process for preparing a water dispersible roast beef flavor and aroma composition which comprises liquefying comminuted beef by heating said beef in the presence of 0–50 pounds of water per 100 pounds of beef, 0.05–1% of lactic acid by weight of beef, and 0–50 pounds of an oleaginous material per 100 pounds of beef at temperatures of about 350° F.–420° F. and autogenous pressures to hydrolyze the beef protein and maintaining said comminuted beef at such temperatures and pressures for 0–5 minutes until visible discrete meat fibers substantially disappear whereby said roast beef flavor and aroma is developed throughout the liquefied beef, thereafter immediately cooling said liquefied beef to a temperature below about 200° F., homogenizing said liquefied beef and then drying said liquefied beef.

8. A process for preparing a water-dispersible chicken liver flavor and aroma composition of high concentration and strength which comprises liquefying chicken hearts by heating in the presence of moisture at temperatures of about 345° F.–365° F. and autogenous pressures to hydrolyze the chicken heart protein whereat said chicken liver flavor and aroma is developed throughout the liquefied chicken hearts, thereafter immediately cooling the heated mixture to a temperature below about 200° F. and homogenizing said mixture.

9. A process according to claim 2 wherein said liquefied meat is filtered to remove solid matter.

10. A process according to claim 2 wherein said liquefied meat is dried.

References Cited
UNITED STATES PATENTS

| | | | |
|---|---|---|---|
| 186,605 | 1/1877 | Maumann | 99—110 |
| 2,512,375 | 6/1950 | Parfentjev | 99—18 |
| 2,589,288 | 3/1952 | Ryan | 99—111 X |
| 2,622,028 | 12/1952 | Torr | 99—107 |
| 2,857,278 | 10/1958 | Milner | 99—14 |
| 3,047,395 | 7/1962 | Rusoff et al. | 99—107 X |

FOREIGN PATENTS 10,961 of 1890    5/1891    Great Britain.

HYMAN LORD, *Primary Examiner.*